United States Patent
O'Neill et al.

(10) Patent No.: US 9,876,238 B2
(45) Date of Patent: Jan. 23, 2018

(54) FUEL CELL FLUID CHANNELS

(75) Inventors: Jonathan Daniel O'Neill, Manchester, CT (US); Timothy W. Patterson, West Hartford, CT (US); Christopher John Carnevale, Vernon, CT (US); Roopnarine Sukhram, Hartford, CT (US)

(73) Assignee: Audi AG, Ingolstadt (DE)

( * ) Notice: Subject to any disclaimer, the term of this patent is extended or adjusted under 35 U.S.C. 154(b) by 786 days.

(21) Appl. No.: 13/489,452

(22) Filed: Jun. 5, 2012

(65) Prior Publication Data

US 2013/0323623 A1 Dec. 5, 2013

(51) Int. Cl.
| | |
|---|---|
| *H01M 8/0265* | (2016.01) |
| *H01M 8/026* | (2016.01) |
| *H01M 8/0267* | (2016.01) |
| *H01M 8/04029* | (2016.01) |

(52) U.S. Cl.
CPC ......... *H01M 8/0265* (2013.01); *H01M 8/026* (2013.01); *H01M 8/0267* (2013.01); *H01M 8/04029* (2013.01)

(58) Field of Classification Search
CPC .. H01M 8/0265; H01M 8/026; H01M 8/0267; H01M 8/04029
See application file for complete search history.

(56) References Cited

U.S. PATENT DOCUMENTS

| | | | | |
|---|---|---|---|---|
| 6,544,681 | B2 * | 4/2003 | McLean | H01M 8/0254 429/492 |
| 6,586,128 | B1 * | 7/2003 | Johnson | H01M 8/0258 429/443 |
| 6,756,149 | B2 * | 6/2004 | Knights et al. | 429/435 |
| 7,041,408 | B1 | 5/2006 | Meyers | |
| 2004/0023100 | A1 * | 2/2004 | Boff et al. | 429/38 |
| 2005/0221152 | A1 | 10/2005 | Turpin et al. | |
| 2007/0105001 | A1 * | 5/2007 | Ohma | H01M 4/861 429/434 |
| 2009/0208803 | A1 * | 8/2009 | Farrington | H01M 8/0258 429/434 |
| 2012/0164559 | A1 * | 6/2012 | Darling | H01M 8/0204 429/514 |
| 2013/0059228 | A1 * | 3/2013 | Glandt | H01M 8/026 429/483 |

FOREIGN PATENT DOCUMENTS

| | | |
|---|---|---|
| JP | 10-302816 A | 11/1998 |
| JP | 2000-251913 A | 9/2000 |
| JP | 2003-142126 A | 5/2003 |
| JP | 2007-207731 A | 8/2007 |

(Continued)

OTHER PUBLICATIONS

International Search Report and Written Opinion for International Application No. PCT/US2013/043832 completed on Sep. 24, 2013.

*Primary Examiner* — Barbara Gilliam
*Assistant Examiner* — Angela Martin
(74) *Attorney, Agent, or Firm* — Seed IP Law Group LLP

(57) ABSTRACT

An example fuel cell assembly includes a plate having channels configured to facilitate movement of a fuel cell fluid near an area of active flow of fuel cell. The channels include portions having a varying depth that extend laterally outside of the area of active flow.

18 Claims, 4 Drawing Sheets

(56) References Cited

FOREIGN PATENT DOCUMENTS

| JP | 2007-265939 A | 10/2007 | | |
|----|---------------|---------|---|---|
| JP | 2009-64772 A | 3/2009 | | |
| JP | 2009-81102 A | 4/2009 | | |
| WO | 2010114558 A1 | 10/2010 | | |
| WO | WO 2010/114558 | * 10/2010 | ............. | H01M 8/02 |
| WO | WO 2010/114558 A1 | * 10/2010 | ............. | H01M 8/04 |

* cited by examiner

FUEL CELL FLUID CHANNELS

STATEMENT REGARDING FEDERALLY SPONSORED RESEARCH OR DEVELOPMENT

This invention was made with government support under Contract No. CA-04-7003-00 awarded by the United States Department of Transportation. The Government has certain rights in this invention.

BACKGROUND

This disclosure relates to plates that facilitate fuel cell fluid movement and, more particularly, to channels on such plates.

Fuel cells typically include an anode catalyst, a cathode catalyst, and an electrolyte material between the anode and cathode catalysts for generating an electric current from a known electrochemical reaction between reactants, such as fuel and an oxidant. The fuel cell may include flow field plates with channels for directing the reactants to the respective catalysts. The electrolyte material may be a polymer layer, typically referred to as a polymer electrolyte membrane or PEM, which is arranged between the flow field plates. The fuel cell may include flow fields with channels for moving fluids for cooling and/or humidification through the fuel cell. The fuel, oxidant, and fluids for cooling and/or humidification are types of fuel cell fluids. Some of the fuel cell fluids may be gases and others may be liquids.

Bubbles of air, for example, may build-up within the liquid channels. The bubbles can undesirably influence flow of fluid through the channels of the flow field. The bubble build-up can cause porous plates, in particular, to dry out, overheat, or both. Some manufacturing techniques produce channels prone to bubble build-up.

SUMMARY

An example fuel cell assembly includes a plate having channels configured to facilitate movement of a fuel cell fluid near an area of active flow of fuel cell. The channels include portions having a varying depth that extend laterally outside of the area of active flow.

Another example fuel cell assembly includes a plate having a first plurality of channels extending in a first direction and a second plurality of channels extending in a second direction transverse to the first direction. The first plurality of channels overlaps the second plurality of channels in an overlapping area of the plate, and the first plurality of channels include a portion having a varying depth. The portion extends from the overlapping area past a laterally outermost one of the second plurality of channels.

An example method of forming channels in a fuel cell includes forming channels in the fuel cell plate, the channels having portions with a varying depth. The portions extend laterally outside an area of active flow in a fuel cell assembly when the fuel cell plate is situated within the fuel cell assembly.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
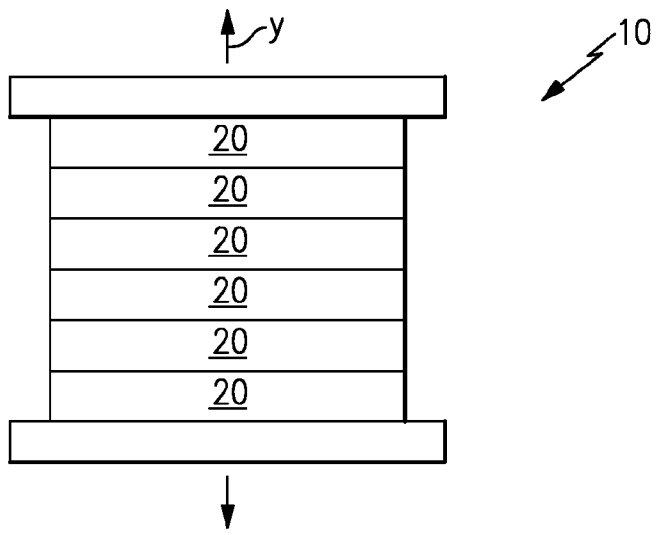
FIG. 1 shows a highly schematic view of an example fuel cell stack assembly.

FIG. 1 shows a fuel cell assembly 10 for generating an electric current from a known electrochemical reaction between reactant gases, for example. It is to be understood that the disclosed arrangement of the fuel cell assembly 10 is only an example and that the concepts disclosed herein may be applied to other fuel cell arrangements.

The example fuel cell assembly 10 includes one or more fuel cell units 20 that may be stacked to provide the fuel cell assembly 10. The fuel cell units 20 are stacked relative to each other along an axis y.

Figure 2:
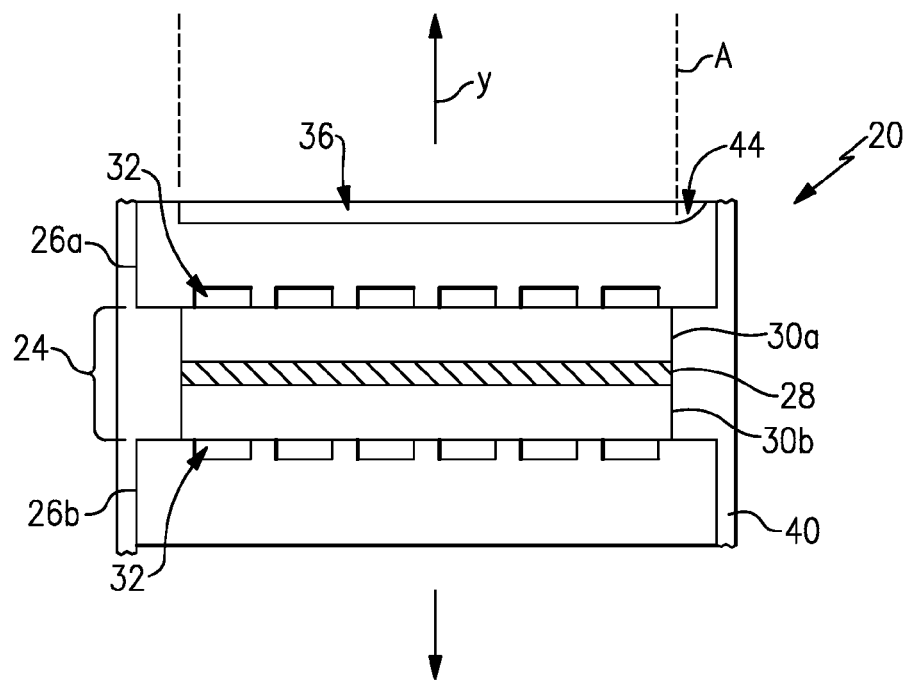
FIG. 2 shows a cross-sectional view of a fuel cell unit of the fuel cell stack assembly of FIG. 1.

As shown in FIG. 2, each of the fuel cell units 20 includes an electrode assembly 24 and flow field plates 26a and 26b for delivering reactant gases (e.g., air and hydrogen) to the electrode assembly 24. The flow field plate 26a may be regarded as an air plate for delivering air and the flow field plate 26b may be regarded as a fuel plate for delivering hydrogen.

The electrode assembly 24 includes a polymer electrolyte membrane (PEM) 28, also referred to as a proton exchange membrane, between a cathode catalyst 30a and an anode catalyst 30b. Although not shown, gas diffusion layers may be used between the flow field plates 26a and 26b and the electrode assembly 24 to facilitate distribution of the reactant gases.

The fuel cell unit 20 includes an area of active flow A extending along the axis y. The lateral outer boundaries of the area of active flow A are aligned with the perimeter of the PEM 28 in this example. The area of active flow A corresponds, in this example, to the electrochemically active area of the fuel cell unit 20. The area of active flow A often refers to the portion of the fuel cell unit 20 where the chemical reaction takes place.

Each of the flow field plates 26a and 26b includes channels 32 for delivering the respective reactant gases to the cathode catalyst 30a or the anode catalyst 30b. Each of the flow field plates 26a and 26b may include inlets for delivering reactant gas to the flow field and outlets for exhausting unused reactant gas from the flow field.

The flow field plate 26a, flow field plate 26b, or both may also circulate coolant, such as water, in coolant channels 36. The coolant helps maintain a desired operating temperature of the fuel cell unit 20 and hydrate the reactant gases. The channels 36 could also be used to guide flow of an oxidant or a reactant.

In this example, the coolant channels 36 are located on a side of the flow field plate 26a opposite the channels 32. In this example, the channels 32 are within the area of active flow A. The channels 36, however, include portions 44 that extend laterally outside the area of active flow A. Lateral, in this example, is used to describe position or location with reference to the axis y. Channels closer to the perimeter of the plates are laterally outward of other, more centrally located channels.

The flow field plate 26a is a porous plate in this example. The porous plate facilitates hydrating the reactant gases as moisture is able to move through pores in the plate 26a from the channels 36 to the channels 32.

In the arrangement shown, the electrode assembly 24 is clamped between the flow field plates 26a and 26b (e.g., between ribs that form the channels 32). The clamping force restricts movement of the PEM 28 relative to the flow field plates 26a and 26b.

A seal 40 extends around the perimeter of the fuel cell assembly 10. The seal 40 maintains the reactant gases and water byproduct within the fuel cell assembly 10. The perimeter sealing may also further restrict movement of the PEM 28.

Figure 3:
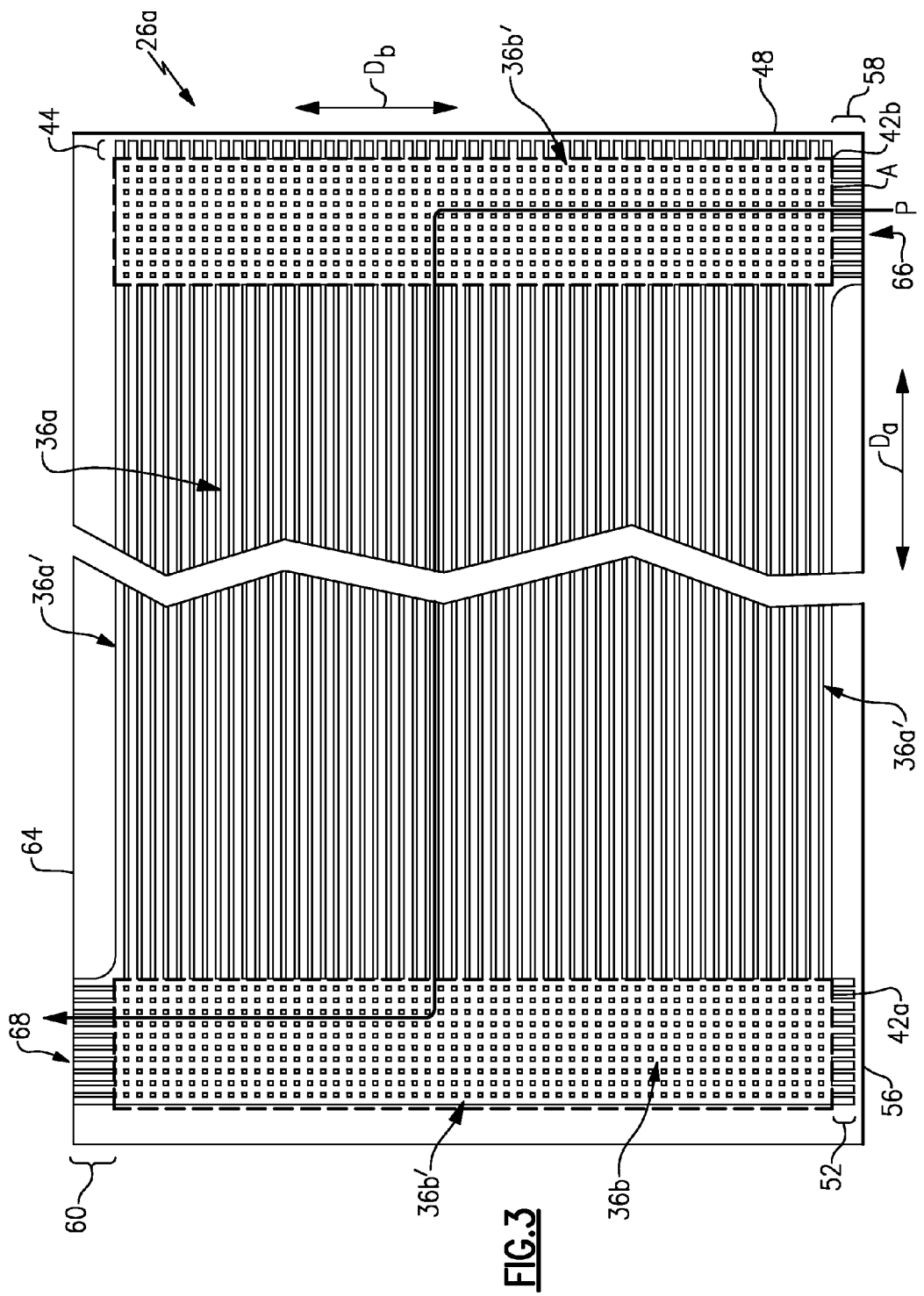
FIG. 3 shows a top view of an example flow field plate from the fuel cell of FIG. 2.
Figure 4:
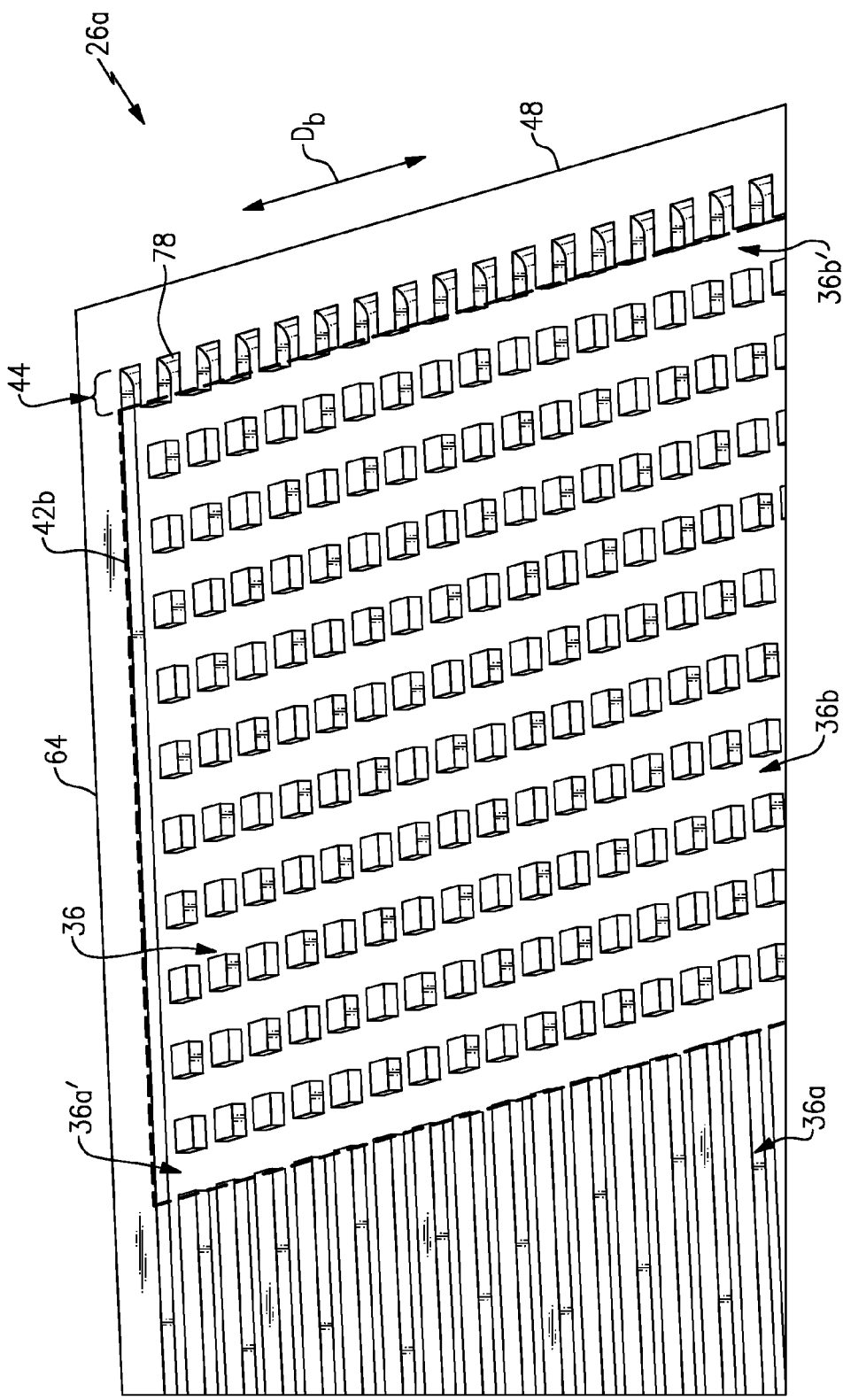
FIG. 4 shows a close-up perspective view of a portion of the flow field plate of FIG. 3.

Referring to FIGS. 3 and 4 with continuing reference to FIG. 2, the channels 36 of the plate 26a include first channels 36a and second channels 36b. The first channels 36a extend in a direction $D_a$, and the second channels 36b extend in at least one direction $D_b$. The direction $D_a$ is transverse to the direction $D_b$. In this example, the direction $D_a$ is perpendicular to the direction $D_b$.

The plate 26a includes overlapping areas 42a and 42b where the first channels 36a overlap the second channels 36b. The laterally outer perimeters of the overlapping areas 42a and 42b are established by the laterally outer channels 36a' and the laterally outer channels 36b'. Portions of the channels 36a and 36a' extending past the laterally outer channels 36b' are not in the overlapping areas 42a and 42b. Similarly, portions of the channels 36b extending laterally past the laterally outer channels 36a' are not in the overlapping areas 42a and 42b.

The area of active flow A consists of all the channels through which the fuel cell fluid flows to move from the inlet 66 to the outlet 68. In this example, it includes the inlet channels 58, the outlet channels 60, the overlapping areas 42a and 42b, and the rectangular region situated directly between the overlapping areas 42a and 42b.

The channels 36a and 36a' include portions 44 extending laterally outside the area of active flow A. These portions 44 do not extend to a laterally outer edge 48 of the plate 26a. Each portion 44 has one end which does not connect to another channel or plate edge. Thus, the fuel cell fluid may fill portions 44 without actively flowing through portions 44.

Some of the channels 36b and 36b' include portions 52 extending laterally outside the area of active flow A. The portions 52 do not extend to a laterally outer edge 56 of the plate 26a. Each portion 52 has one end which does not connect to another channel or plate edge. Thus, the fuel cell fluid may fill portions 52 without actively flowing through portions 52.

Some others of the channels 36b and 36b' include portions 58 extending laterally outside the area of active flow A. The portions 58 extend to the laterally outer edge 56 of the plate 26a in this example.

Some others of the channels 36b and 36b' include portions 60 extending laterally outside the area of active flow A. The portions 60 extend to a laterally outer edge 64 of the plate 26a.

During operation of the fuel cell unit 20, fluid enters through the portions 58, moves through the remaining portions of the channels 36, and exits through the portions 60. The portions 58 thus provide an inlet 66 to the plate 26a, and the portions 58 provide an outlet 68. The fluid generally follows a path P.

Bubbles entrained within fluid moving through the channels 36 tend to hang-up at intersections of channels 36 if both intersecting channels have varying depths or tapers. Bubble hang-up may cause all the water in pores in that region of the plate to evaporate, creating a gas leak path.

Bubble hang-up may also cause ineffective cooling. A feature of the disclosed examples is a portion of a channel having a varying depth. The portion is laterally outside of an overlapping area of channels and an area of active flow of a fuel cell unit. Positioning the portion having a varying depth outside the area of active flow A ensures that ineffectively cooled areas associated with bubble hang-up are outside the area of active flow A. The plates may be oversized laterally relative to prior art plates to accommodate the portions having the varying depth. The portion having the varying depth may be positioned entirely or partially outside the area of active flow A.

Figure 5:
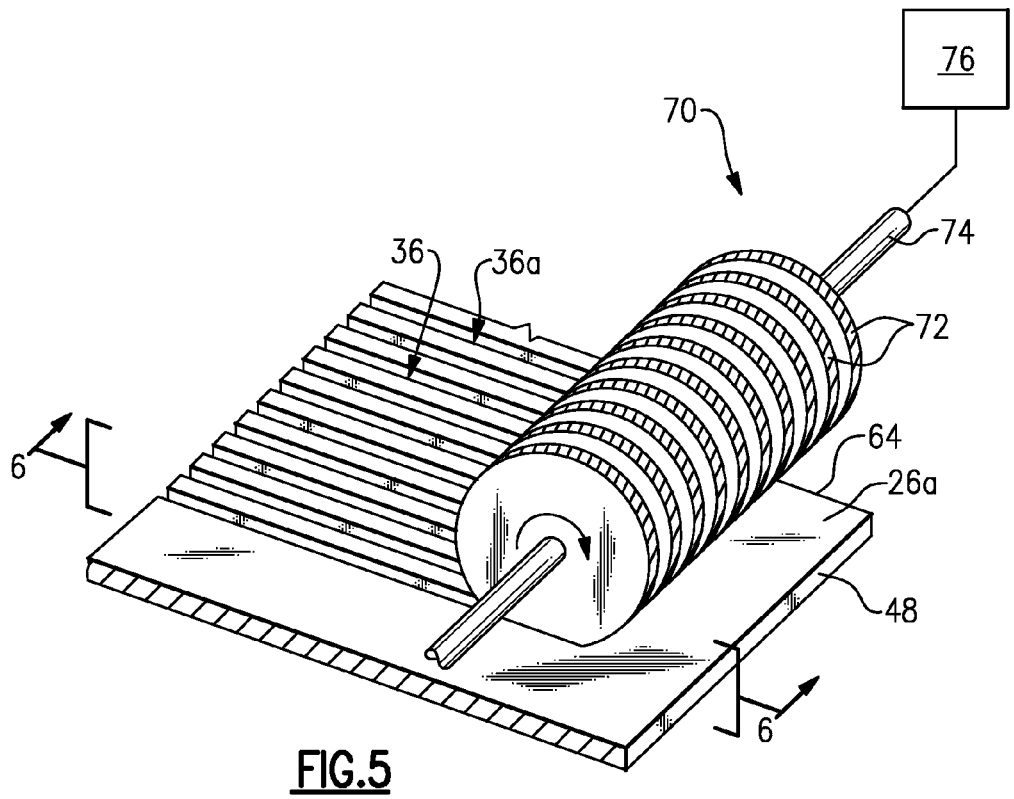
FIG. 5 shows the flow field plate of FIG. 3 during a portion of a channel forming process.
Figure 6:
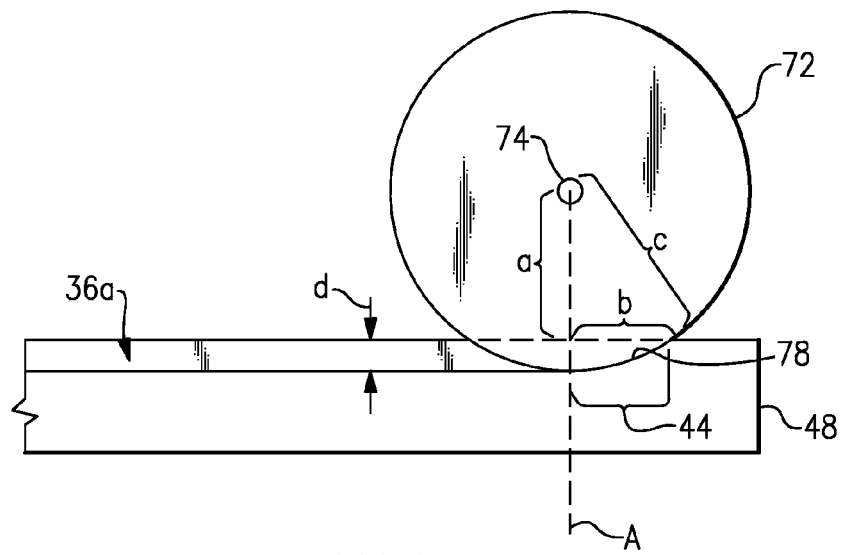
FIG. 6 shows a section view at line 6-6 in FIG. 5.

Referring to FIGS. 5 to 6 with continuing reference to FIGS. 2 and 3, a process for establishing the channels 36 uses a gang milling assembly 70 to forms the channels 36 in plate 26a. The gang milling assembly 70 includes a plurality of blades 72 mounted to a hub 74. An electric motor 76 rotates the hub 74 to rotate the blades 72. The rotating hub 74 and blades 72 move across a surface of the plate 26a to form the channels 36.

In this example, the gang milling assembly 70 moves across the plate 26a in a first direction to form the channels 36a. Each of the blades 72 cuts one of the channels 36 during a single pass. Additional passes in other areas of the plate 26a may be necessary depending on the desired number of channels 36a and the number of blades. The hub 74 and the blades 72 subsequently move across the same surface of the plate 26a in a second direction (e.g., are rotated 90 degrees compared to the first direction) to form the channels 36b.

The gang milling assembly 70 is shown forming the portions 44 of some of the channels 36a. Because the channels 36a are not intended to extend to the laterally outer edge 48 of the plate 26a, the blades 72 are pulled away from the plate 26a before the blades 72 reach the laterally outer edge 48. The blades 72 are circular, which causes the ends of the channels 36a to have a tapered floor 78 (or an area of varied depth).

Other than the portions 44, the channels 36a have a relatively consistent depth d because a selected depth of the blade 72 has passed through these areas. In some examples, some areas of the channels in the overlapping area 42a have tapered floors as this is where the gang milling assembly 70 begins to cut the channels 36a. For example, in overlapping region 42a, portions of channels 36a may have tapered floors, but intersecting channels 36b do not have tapered floors because tapered portion 52 is outside of overlapping region 42a. Likewise, in overlapping region 42b, portions of channels 36b may have tapered floors, but intersecting channels 36a do not have tapered floors because tapered portion 44 is outside of overlapping region 42b. The location of tapered portions 52 and 44 outside of overlapping regions 42a and 42b mitigates the risk of bubble hang-up by ensuring that tapered portions never intersect each other. The length of the portions 44 in a direction of flow along the channels 36a is described by the equation $b=\sqrt{[c^2-(c-d)^2]}$ wherein b is the length, c is the radius of the blade 72, and d is the selected depth of the channels 36a.

Other example plates (not shown) may include channels that direct fluid flow along a path of a coolant back and forth across the plate multiple times as the flow moves from an inlet to an exit. Non-overlapping portion 44 may be located in such a plate.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A fuel cell assembly, comprising:
a plate having a plurality of channels configured to facilitate movement of a fuel cell fluid within an area of active flow of the fuel cell, the area of active flow being defined by a portion of the plate where the fuel cell fluid actively flows from a fuel cell fluid inlet of the plate to a fuel cell fluid outlet of the plate, wherein each of the plurality of channels includes a portion having a varying depth which extends laterally outside of the area of active flow, and which does not connect to another channel to dead end in a location outside the area of active flow such that the fuel cell fluid may fill the portion that dead ends outside the area of active flow but not actively flow through said portion as the fuel cell fluid actively flows from the fuel cell fluid inlet to the fuel cell fluid outlet during operation.

2. The fuel cell assembly of claim 1, wherein a depth of the channels laterally inside the area of active flow is about the same.

3. The fuel cell assembly of claim 1, wherein a depth of the portion at a first location is greater than a depth of the portion at a second location.

4. The fuel cell assembly of claim 3, wherein the first location is laterally closer to the area of active flow than the second location.

5. The fuel cell assembly of claim 1, wherein the channels comprise a group of channels aligned in a first direction overlapping with a group of channels aligned in a second direction that is transverse to the first direction.

6. The fuel cell assembly of claim 5, including a channel overlapping area where the channels aligned in the first direction overlap the channels aligned in the second direction.

7. The fuel cell assembly of claim 6, wherein the channels aligned in the first direction and the channels aligned in the second direction include respective portions having a varying depth, wherein the portions extend laterally outside of the area of active flow, and the portions are laterally outside the overlapping area.

8. The fuel cell assembly of claim 6, wherein the overlapping area is exclusively within the area of active flow.

9. The fuel cell assembly of claim 6, wherein the overlapping area has a laterally outer boundary corresponding to laterally outer boundaries of an electrochemically active area of a fuel cell having the plate.

10. The fuel cell assembly of claim 6, wherein the portions of the group of channels aligned in the first direction, which extend laterally outside of the area of active flow, extend past a laterally outermost one of the group of channels aligned in the second direction.

11. The fuel cell assembly of claim 1 wherein the area of active flow includes all of the channels through which the fuel cell fluid can flow to move from the fuel cell fluid inlet of the plate to the fuel cell fluid outlet of the plate.

12. A fuel cell assembly, comprising:
a plate having a plurality of channels, the channels including respective first channel portions through which a fuel cell fluid can flow along one or more paths extending from a fuel cell fluid inlet of the plate to a fuel cell fluid outlet of the plate, and respective second channel portions extending laterally outside of the paths, the second channel portions having respective varying depths and dead ending outside an area of active flow defined by a portion of the plate where the fuel cell fluid actively flows from the fuel cell fluid inlet of the plate to the fuel cell fluid outlet of the plate such that the fuel cell fluid may fill the second channel portions that dead end outside the area of active flow but not actively flow through the second channel portions as the fuel cell fluid actively flows from the fuel cell fluid inlet to the fuel cell fluid outlet during operation.

13. The fuel cell assembly of claim 12 wherein a depth of a given second channel portion at a first location is greater than a depth of the given second channel portion at a second location, wherein the first location is laterally closer to the paths than the second location.

14. The fuel cell assembly of claim 12, wherein the channels comprise a plurality of first channels aligned in a first direction and a plurality of second channels aligned in a second direction transverse to the first direction, wherein the first channels overlap with the second channels.

15. A fuel cell assembly, comprising:
a plate having a plurality of channels, the channels including respective first channel portions through which a fuel cell fluid can flow along one or more paths extending from a fuel cell fluid inlet of the plate to a fuel cell fluid outlet of the plate, and respective second channel portions through which the fuel cell fluid cannot actively flow, the second channel portions having respective varying depths and dead ending in a location outside an area of active flow defined by a portion of the plate where the fuel cell fluid actively flows from the fuel cell fluid inlet of the plate to the fuel cell fluid outlet of the plate such that the fuel cell fluid may fill the second channel portions that dead end outside the area of active flow but not actively flow through the second channel portions as the fuel cell fluid actively flows from the fuel cell fluid inlet to the fuel cell fluid outlet during operation.

16. The fuel cell assembly of claim 15 wherein the second channel portions extend laterally outside of the paths.

17. The fuel cell assembly of claim 15 wherein a depth of a given second channel portion at a first location is greater than a depth of the given second channel portion at a second location, wherein the first location is laterally closer to the paths than the second location.

18. The fuel cell assembly of claim 15, wherein the channels comprise a plurality of first channels aligned in a first direction and a plurality of second channels aligned in a second direction transverse to the first direction, wherein the first channels overlap with the second channels.

* * * * *